United States Patent
Rogner

(10) Patent No.: US 10,059,283 B2
(45) Date of Patent: Aug. 28, 2018

(54) MOTOR VEHICLE

(71) Applicant: Dr. Ing. h.c. F. Porsche Aktiengesellschaft, Stuttgart (DE)

(72) Inventor: Gert Rogner, Remchingen (DE)

(73) Assignee: Dr. Ing. H.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/681,150

(22) Filed: Apr. 8, 2015

(65) Prior Publication Data

US 2015/0291108 A1 Oct. 15, 2015

(30) Foreign Application Priority Data

Apr. 11, 2014 (DE) .......................... 10 2014 105 201

(51) Int. Cl.
*B60R 13/04* (2006.01)
*B60R 19/18* (2006.01)

(52) U.S. Cl.
CPC ...... *B60R 13/04* (2013.01); *B60R 2019/1886* (2013.01)

(58) Field of Classification Search
CPC ............ B60R 13/04; B60R 2019/1886; B60R 2019/247; B60R 13/06; B60R 19/24; B60R 19/247; B60R 2011/04; B60R 2011/0042; B60R 2011/0043; B60R 2011/0045; B60R 2011/005; B60R 2011/0059; B60R 2013/018; B60Q 1/26; B62D 33/06; B62D 27/00
See application file for complete search history.

(56) References Cited

U.S. PATENT DOCUMENTS

| | | | | |
|---|---|---|---|---|
| 3,591,229 A | * | 7/1971 | Wilfert | B62D 35/007 296/208 |
| 4,982,994 A | * | 1/1991 | Sekiguchi | B62D 25/087 296/203.03 |
| 5,882,054 A | * | 3/1999 | Devilliers | B60R 19/24 293/155 |
| 5,893,638 A | | 4/1999 | Huefner et al. | |
| 6,135,517 A | * | 10/2000 | Cordebar | B60R 19/24 293/128 |
| 6,209,940 B1 | * | 4/2001 | Jocher | B60R 19/24 280/154 |

(Continued)

FOREIGN PATENT DOCUMENTS

| | | |
|---|---|---|
| DE | 24 14 157 | 10/1987 |
| DE | 37 16 700 | 12/1988 |

(Continued)

OTHER PUBLICATIONS

Emglish Translation of Korean Office Action.
German Search Report dated Feb. 10, 2015.
Russian Office Action dated Jun. 1, 2016.

*Primary Examiner* — Bao Q Truong
*Assistant Examiner* — Fatima Farokhrooz
(74) *Attorney, Agent, or Firm* — Gerald E. Hespos; Michael J. Porco; Matthew T. Hespos

(57) ABSTRACT

A motor vehicle (10) has a body side part (14) and a trim component (18). To simplify the production of motor vehicles an additional component (20) is arranged between the body side part (14) and the trim component (18) to equalize the geometry between the body side part (14) and the trim component (18).

14 Claims, 1 Drawing Sheet

(56) References Cited

U.S. PATENT DOCUMENTS

| | | | | |
|---|---|---|---|---|
| 6,769,727 | B2* | 8/2004 | Delavalle | B62D 25/163 |
| | | | | 293/120 |
| 8,904,735 | B2* | 12/2014 | Grandgirard | B60J 1/10 |
| | | | | 52/745.15 |
| 2004/0207232 | A1* | 10/2004 | Neubrand | B60J 7/145 |
| | | | | 296/107.17 |
| 2006/0012203 | A1* | 1/2006 | Andre | B62D 25/163 |
| | | | | 296/29 |
| 2010/0089957 | A1* | 4/2010 | Barth | B60R 9/10 |
| | | | | 224/497 |
| 2010/0186301 | A1* | 7/2010 | Drozd | B60J 5/0402 |
| | | | | 49/490.1 |
| 2012/0237725 | A1* | 9/2012 | Stossel | B60R 13/02 |
| | | | | 428/139 |
| 2013/0134732 | A1* | 5/2013 | Meyers | B60R 19/24 |
| | | | | 296/29 |
| 2013/0234457 | A1* | 9/2013 | Sachs | B60R 19/24 |
| | | | | 293/155 |
| 2014/0062117 | A1* | 3/2014 | Baxter | B60R 13/04 |
| | | | | 296/1.08 |
| 2014/0110973 | A1 | 4/2014 | Danev | |
| 2015/0124470 | A1* | 5/2015 | Calderas | F21S 48/1122 |
| | | | | 362/519 |
| 2016/0236613 | A1* | 8/2016 | Trier | B60R 13/04 |

FOREIGN PATENT DOCUMENTS

| | | |
|---|---|---|
| DE | 195 46 436 | 6/1997 |
| DE | 10 2005 042 688 | 3/2007 |
| DE | 10 2006 015 399 | 10/2007 |
| DE | 10 2011 114 393 | 4/2008 |
| DE | 10 2007 017 455 | 10/2008 |
| DE | 10 2012 004 814 | 9/2013 |
| DE | 10 2012 109 951 | 4/2014 |
| JP | H061266 A | 1/1994 |
| JP | 2000103301 A * | 4/2000 |
| RU | 16723 U1 | 10/2001 |
| RU | 27031 U1 | 10/2003 |

* cited by examiner

A-A

B-B

MOTOR VEHICLE

CROSS REFERENCE TO RELATED APPLICATION

This application claims priority under 35 USC 119 to German Patent Appl. No. 10 2014 105 201.3 filed on Apr. 11, 2014, the entire disclosure of which is incorporated herein by reference.

BACKGROUND

1. Field of the Invention

The invention relates to a motor vehicle having a body side part and a trim component.

2. Description of the Related Art

German laid-open specification DE 10 2005 042 688 A1 discloses a trim component for a motor vehicle having a wing and a side door. The trim component is arranged between mutually facing end sections of the wing and side door and has an air exchange opening. German patent DE 37 16 700 C2 discloses a body for a passenger car with a common basic design that can be produced in two variants. The first variant is hatchback version with tailgate and the second variant is a notchback version. An additional tail part can be welded to rear edges of outer side walls. Vertical or substantially vertical welded connecting points on each side are concealed by a ventilation grille or a covering strip. German patent DE 24 14 157 C2 discloses a lateral trim component for motor vehicles that is arranged under a joint running horizontally. A trim component is provided between a door cutout and a wheel arch and is fixed by easily detachable elastic clip elements to a chassis of the motor vehicle.

The object of the invention is to simplify the production of motor vehicles having a body side part and a trim component.

SUMMARY OF THE INVENTION

The invention relates to a motor vehicle that has a body side part, a trim component and an additional component between the body side part and the trim component. The additional component equalizes the geometry between the body side part and the trim component. The body side part is, for example, a sheet metal part. The trim component is, for example, a plastic part. The additional component permits equalization between the geometry of the body side part and the trim component in a simple way. As a result, the use of different body side parts with a common trim component or vice versa advantageously is made possible. As a result, the production of different shape variants and derivatives of a motor vehicle is simplified.

The additional component may have at least one additional function. As a result, the production of the motor vehicle is simplified, since neither the body side part nor the trim component is needed to implement the additional function.

The additional component may represent a local widening for a wheel covering. As a result, adaptation to country-specific requirements of buyers of the motor vehicle is simplified.

The additional component may be an air inlet for ventilating an adjacent lighting element. As a result, the lighting element can be supplied with an air stream in a simple way. Changes to the body side part and the trim component are not necessary.

The additional component may be a sensor device for a parking assistant. Thus, the body side part and the trim component advantageously are not needed for attachment of the sensor device.

The additional component may formed from a different material than the body side part and/or the trim component. As a result, high-value accents in the external appearance of the motor vehicle can be placed in a simple way.

The additional component may conceal fixing means of the body side part and/or the trim component so that the visual impression of the motor vehicle is improved.

The additional component may be colored differently than the body side part and/or the trim component to improve the overall visual appearance of the motor vehicle.

The additional component may be arranged between a rear body side part and a tail trim component. As a result, the use of different body side parts with a common tail trim component or vice versa advantageously is made possible.

The invention further relates to a platform system for producing different shape variants or derivatives of a previously described motor vehicle, having differently shaped body side parts that are combined with a common tail cladding by means of the additional component.

Further advantages, features and details of the invention emerge from the following description, in which various exemplary embodiments are described in detail with reference to the drawing.

DETAILED DESCRIPTION OF THE PREFERRED EMBODIMENTS

Figure 1:
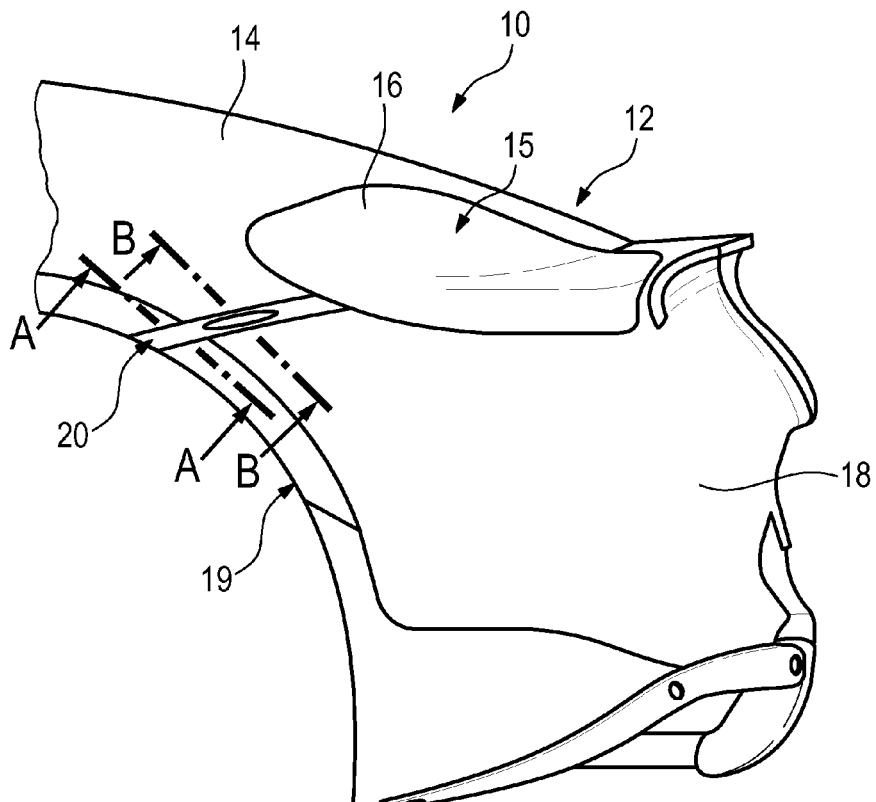
FIG. 1 is a perspective view of a tail area of a motor vehicle according to the invention.

A motor vehicle in accordance with an embodiment of the invention is identified by the numeral 10 in FIG. 1. The motor vehicle 10 has a tail area 12 and a body side part 14 is arranged in the tail area 12. Hence, the body side part 14 and may be referred to as a rear body side part.

A tail light 15 also is arranged in the tail area 12 of the motor vehicle 10 and has a lighting element 16. The body side part 14 has a cutout for the tail light 15.

A trim component 18 also is arranged in the tail area 12 and has a cutout for the tail light 15. The trim component 18 may be referred to as a tail trim component.

The motor vehicle 10 also has a wheel cutout 19 and an additional component 20 is arranged between the rear body side part 14 and the tail trim component 18. The additional component 20 extends from a wheel cutout 19 to the lighting element 16 of the rear light 15.

The wheel cutout 19 is cut out partly in the body side part 14 and partly in the trim component 18. The additional component 20 creates geometric equalization between the body side part 14 and the trim component 18.

Figure 2:
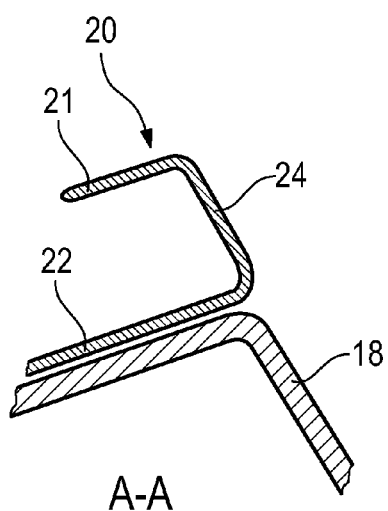
FIG. 2 is an enlarged illustration of a section A from FIG. 1.

As illustrated in FIG. 2, the region of the additional component 20 at the section A-A has a substantially U-shaped cross section with a base 24 from which two limbs 21 and 22 are angled away. The limb 21 rests on the body side part (not shown in FIG. 2), while the limb 22 rests on the trim component 18.

Figure 3:
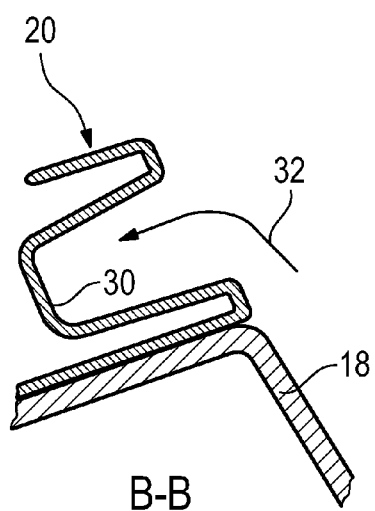
FIG. 3 shows an enlarged illustration of a section B from FIG. 1.

As shown in FIG. 3, the region of the additional component 20 at the section B-B has a depression 30 that defines an air inlet for the lighting element 16 of the tail light 15 in FIG. 1. The depression 30 permits the supply of an air stream, as indicated by the arrow 32.

What is claimed is:

1. A motor vehicle, comprising:
   a body side part having an exterior surface facing outward on the motor vehicle, the exterior surface of the body side part having an edge;
   a trim component having an exterior surface facing outward on the motor vehicle, the exterior surface of the trim component having an edge parallel to and spaced from the edge of the body side part; and
   an additional component between the body side part and the trim component, the additional component having an exterior surface facing outward on the vehicle, the exterior surface of the additional component having a first edge substantially abutting and extending along the edge of the exterior surface of the body side part and a second edge substantially abutting and extending along the edge of the exterior surface of the trim component so that the exterior surface of the additional component extends between the edge of the exterior surface of the body side part and the edge of the exterior surface of the trim component, and the exterior surface of the body side part, the exterior surface of the trim component, and the exterior surface of the additional component are continuous with each other along selected areas of the additional component, the additional component further comprising first and second limbs joined to the respective first and second edges of the exterior surface of the additional component and extending inwardly from the exterior surfaces of the additional component, and the body side part and the trim component, a recess being formed in exterior part of the additional component for producing an air stream to ventilate an electronic component in proximity to the body side part and the trim component.

2. The motor vehicle of claim 1, wherein the additional component has at least one additional function.

3. The motor vehicle of claim 1, further comprising a lighting element in proximity to the body side part and the trim component, the recess in the additional component defining an air inlet for ventilating the lighting element.

4. The motor vehicle of claim 1, wherein the additional component comprises a sensor device for a parking assistant.

5. The motor vehicle of claim 1, wherein the additional component is formed from a different material than the body side part and the trim component.

6. The motor vehicle of claim 1, wherein the additional component conceals fixing means of the body side part and/or the trim component.

7. The motor vehicle of claim 1, wherein the additional component is colored differently than the body side part and the trim component.

8. The motor vehicle of claim 1, wherein the body side part is a rear body side part and the trim component is a tail trim component.

9. A platform system for producing different shape variants or derivatives of a motor vehicle of claim 1, having differently shaped body side parts that are combined with a common tail cladding by means of the additional component.

10. The motor vehicle of claim 2, wherein the additional component forms a local widening for a wheel cutout without changing a geometry of the body side part or the trim component adjacent the wheel cutout.

11. A motor vehicle, comprising:
    a body side part having an exterior surface facing outward on the motor vehicle, the exterior surface of the body side part having an edge;
    a trim component having an exterior surface facing outward on the motor vehicle, the exterior surface of the trim component having an edge parallel to and spaced from the edge of the body side part;
    a wheel cutout adjacent the body side part and the trim component;
    a lighting element adjacent the body side part and the trim component at a position spaced rearward of the wheel cutout; and
    an additional component having a base with an exterior surface facing outward on the vehicle, the exterior surface of the additional component having a first edge substantially abutting and extending along the edge of the exterior surface of the body side part and a second edge substantially abutting and extending along the edge of the exterior surface of the trim component so that the exterior surface of the additional component extends between the edge of the exterior surface of the body side part and the edge of the exterior surface of the trim component and extending from the wheel cutout to the lighting element so that the exterior surface of the body side part, the exterior surface of the trim component, and the exterior surface of the additional component are continuous with each other, at least parts of the additional component have a U-shaped cross-section with first and second limbs joined to the respective first and second edges of the exterior surface of the additional component and extending inwardly from the exterior surfaces of the additional component, the body side part and the trim component, the exterior surface of the additional component including a depression between the wheel cutout to the lighting element, the depression defining an air inlet for ventilating the lighting element.

12. The motor vehicle of claim 11, wherein the additional component is formed from a different material than the body side part and the trim component.

13. The motor vehicle of claim 11, wherein the additional component is colored differently than the body side part and the trim component.

14. The motor vehicle of claim 11, wherein the additional component includes a depression between the wheel cutout to the lighting element, the depression defining an air inlet for ventilating the lighting element.

* * * * *